No. 644,852. Patented Mar. 6, 1900.
C. EICKEMEYER.
ELECTRIC PUMP.
(Application filed July 27, 1899.)
(No Model.) 6 Sheets—Sheet 2.

FIG. 2.

WITNESSES:

INVENTOR
Carl Eickemeyer
BY
ATTORNEYS.

No. 644,852. Patented Mar. 6, 1900.
C. EICKEMEYER.
ELECTRIC PUMP.
(Application filed July 27, 1899.)
(No Model.) 6 Sheets—Sheet 3.

WITNESSES: INVENTOR
Carl Eickemeyer
BY
ATTORNEYS.

No. 644,852. Patented Mar. 6, 1900.
C. EICKEMEYER.
ELECTRIC PUMP.
(Application filed July 27, 1899.)
(No Model.)
6 Sheets—Sheet 6.

FIG. 10.

WITNESSES:
INVENTOR
Carl Eickemeyer
BY
ATTORNEYS.

UNITED STATES PATENT OFFICE.

CARL EICKEMEYER, OF YONKERS, NEW YORK.

ELECTRIC PUMP.

SPECIFICATION forming part of Letters Patent No. 644,852, dated March 6, 1900.

Application filed July 27, 1899. Serial No. 725,218. (No model.)

*To all whom it may concern:*

Be it known that I, CARL EICKEMEYER, a citizen of the United States, residing at Yonkers, in the county of Westchester and State of New York, have invented certain new and useful Improvements in Electric Pumps, of which the following is a specification.

This invention relates to electric pumps, and particularly to improvements over the electric pump forming the subject-matter of my Patent No. 618,404, dated January 31, 1899, in which a dynamometric or relief spring is interposed between the pump driving mechanism and the motor, such a spring being also employed in the present invention.

The main object of this invention is to provide suitable means for maintaining a constant pressure on the mains under conditions of variable water demand.

A further object is to provide means whereby any electric motor may be used in connection with the pumping mechanism without having to use one which is specially constructed with the armature mounted on a hollow shaft, such as is shown in my said patent.

A further object is to provide a specially-designed motor possessing advantages over a motor wherein the armature is magnetized by the field-coils and also to obtain a motor that is as near magnetically perfect as is practicable without directly magnetizing the armature, thus providing a motor which is not liable to become demagnetized or subject to reversals of polarity.

A further object is to so arrange the safety-resistances as that the armature-circuit is increased in resistance only on extreme changes of pressure—as, for instance, suddenly increasing or suddenly decreasing the pump-main pressure through any accident in either the delivery or suction parts of the main.

These are among the objects of the invention.

In the present invention a shunt-motor is used as being best adapted for the work; but wherever reference is made to a motor I desire it expressly understood that I do not wish to confine the invention to such a motor.

The invention consists, in the main, of an electric pump in which, to provide for a varying water demand in the same, there is combined with a pumping apparatus and motor a hydraulic dynamometric regulating device. This hydraulic dynamometric regulating device is adapted to control the motor-resistances and the cut-out, and its operation is dependent on a hydraulically-operated dynamometric spring.

The invention consists also in a motor in which the field-coils are so shaped that the plane of the coils is at all times perpendicular to the armature-radii, or, in other words, the field-coils do not surround the armature through its axial plane, but through the vertical plane, so that all lines of magnetic force generated by the field-coils are at all times perpendicular to the cylindrical plane of the armature and the pole-face air-space.

The invention consists also of certain improvements in the construction of the hydraulic dynamometric regulating device, as will all be described hereinafter and then particularly pointed out in the claims.

In order that my invention may be more fully understood, I will now proceed to describe the same with reference to the accompanying drawings, in which—

Similar letters of reference indicate corresponding parts.

Figure 1:
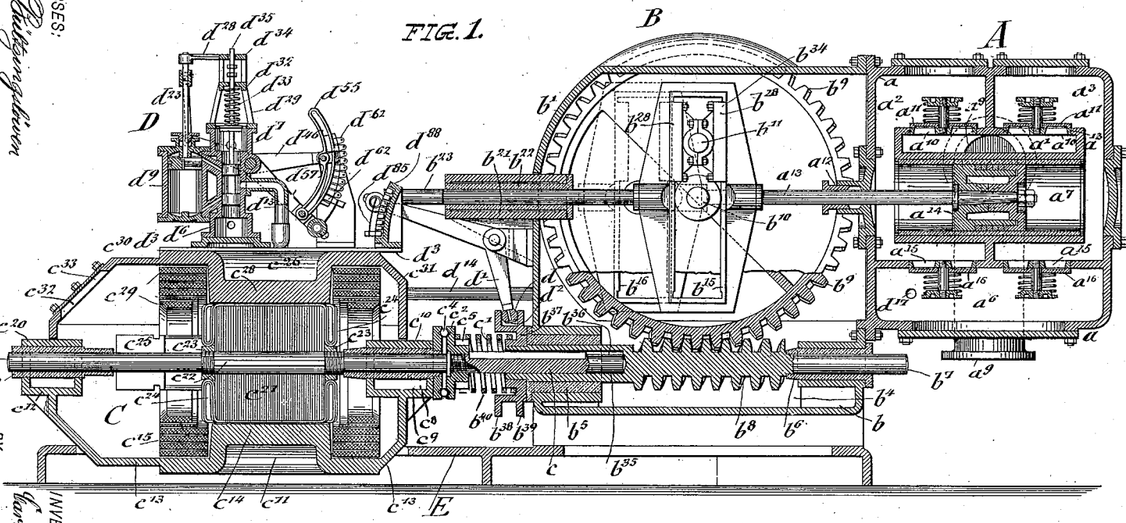
Figure 1 is a vertical longitudinal section of the apparatus, showing the motor, the safety-resistances, relief-spring, the worm, the hydraulic dynamometric regulating device, the pump proper, and the power-transmitting mechanism.
Figure 2:
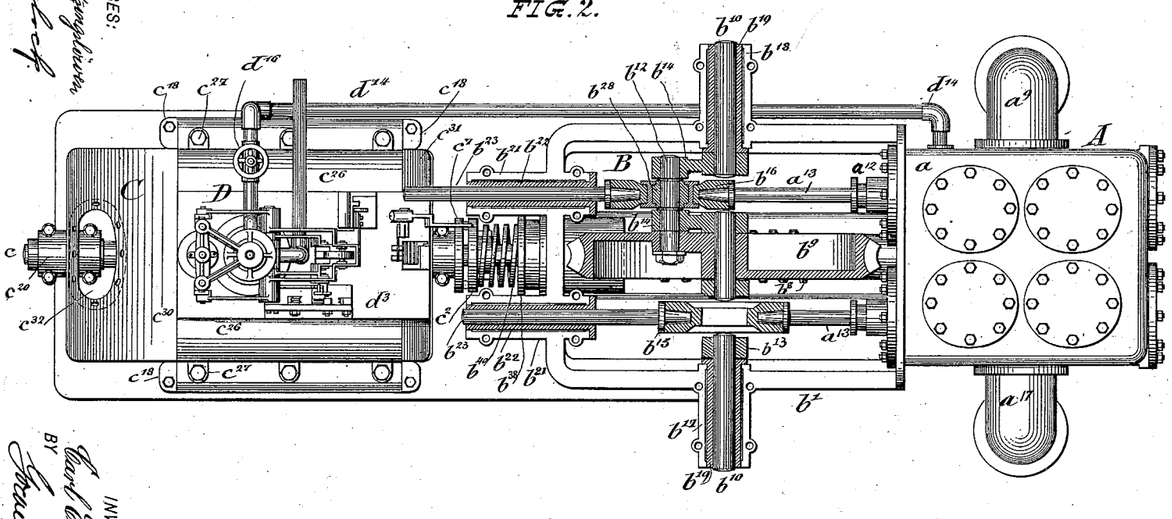
Fig. 2 is a plan view of the motor, hydraulic dynamometric regulating device, and the pump proper and a horizontal section through the intermediate driving mechanism.
Figure 3:
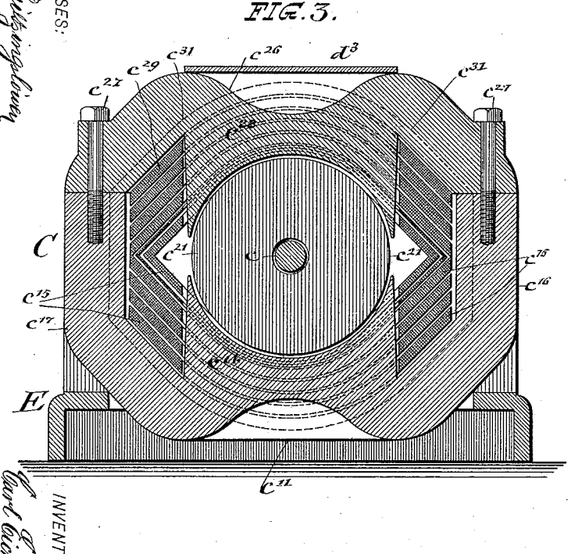
Fig. 3 is a vertical transverse section of the motor.
Figure 4:
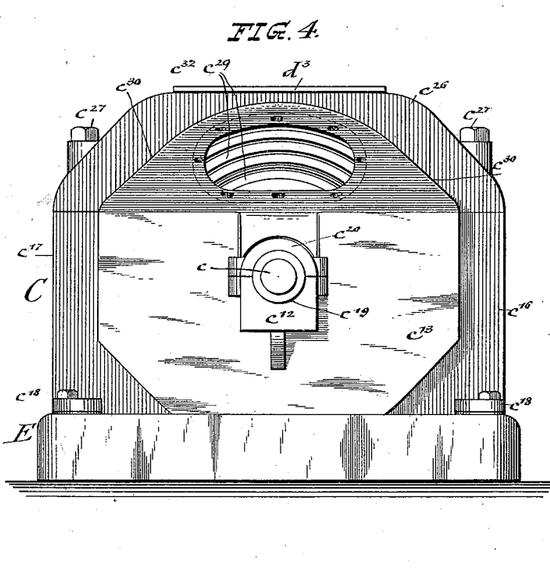
Fig. 4 is an end view of the same.
Figure 5:
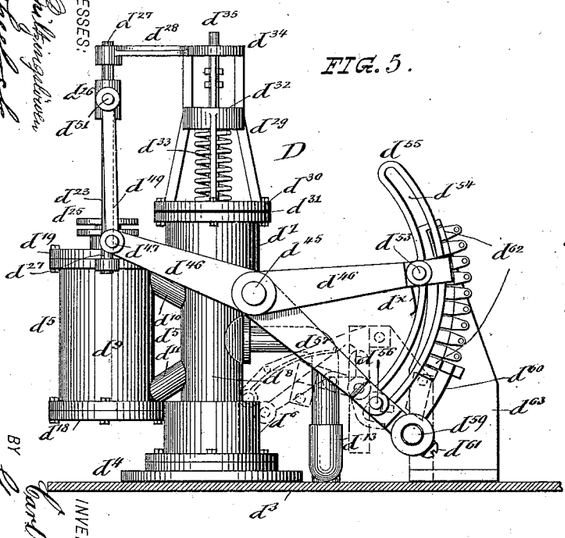
Fig. 5 is a side elevation of the hydraulic dynamometric regulating device.
Figure 6:
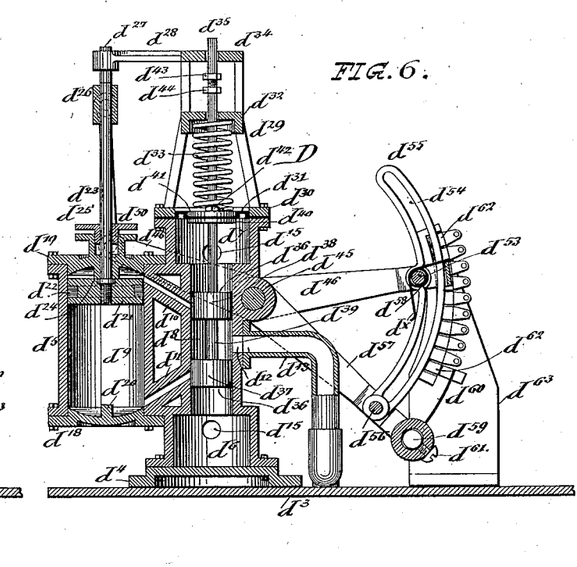
Fig. 6 is a vertical longitudinal section of the same, parts being in elevation.
Figure 7:
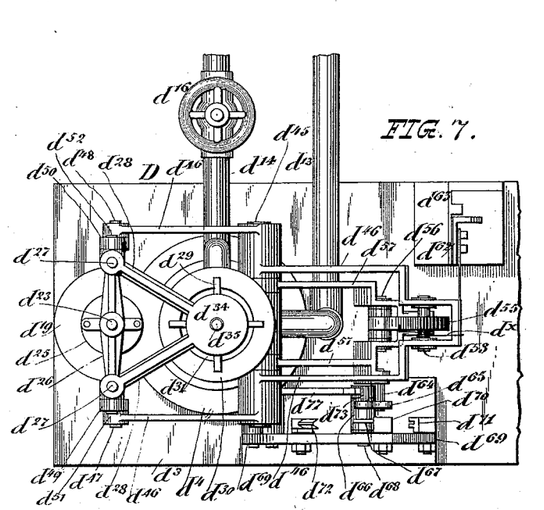
Fig. 7 is a plan view of the said hydraulic dynamometric regulating device.
Figure 8:
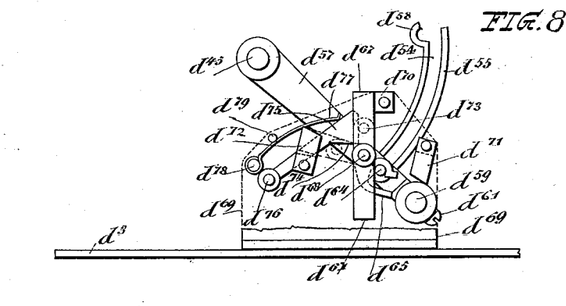
Fig. 8 is a detail of the same.

In the drawings, Figs. 1 and 2, A indicates the pump; B, the driving mechanism; C, the motor; D, the motor-regulating devices, and E the bed-plate which supports said parts. For convenience of description and for readily identifying the details described with the elementary parts A B C D such details bear for the respective elementary parts the same reference-letter, but are differentiated by means of different exponents.

The pump proper, A, will be described as briefly as is consistent with a conception of the present invention, of which the construction of the said pump proper forms no part, as it forms the subject-matter of a separate application. The pump proper comprises a casing $a$, suction-chamber $a'$, two compression-chambers $a^2$ $a^3$, and two others, (not shown,) delivery-chambers $a^6$, and two plunger-cylinders $a^7$, the off one of which is not shown. Suction-chamber $a'$ has an inlet or suction pipe $a^9$ and communicates by means of ports $a^{10}$ with the compression-chambers, said ports being closed by spring-actuated valves $a^{11}$. The inner end of the pump-casing $a$ is provided with stuffing-boxes $a^{12}$, through which are guided the rods $a^{13}$, that carry the plungers $a^{14}$, (one not shown,) which reciprocate in the plunger-cylinders referred to. Each of the compression-chambers has a port $a^{15}$, which leads to the delivery-chamber $a^6$ and which is closed by a valve $a^{16}$. Extending from the delivery-chamber $a^6$ is an outlet-pipe $a^{17}$.

The bed-plate E supports the casing $b$ $b'$ of the driving or power-transmitting mechanism. The inner chamber of worm-casing $b$ forms an oil-well $b^4$. Said worm-casing $b$ is provided with boxes $b^5$ $b^6$, which form bearings for the shafts $b^7$, provided with a worm $b^8$, that meshes with a worm-wheel $b^9$, mounted on shaft $b^{10}$ between cranks $b^{11}$ and $b^{12}$. Shaft $b^{10}$ carries crank-arms $b^{13}$ and $b^{14}$, respectively, of which arms $b^{13}$ support crank-pin $b^{11}$, and arms $b^{14}$ support crank-pin $b^{12}$. The lower casing $b$ carries side supports $b^{17}$ $b^{18}$ for the boxes $b^{19}$, in which the sectional shaft $b^{10}$ is journaled. The lower casing $b$ also carries end supports $b^{21}$ for boxes $b^{22}$, which form guides for rods $b^{23}$ of two yokes $b^{15}$ $b^{16}$, which are supported by the plunger-rods $a^{13}$ and rods $b^{23}$, said yokes forming guides for suitable cross-heads $b^{28}$ on the crank-pins $b^{11}$ and $b^{12}$.

In one end of the worm-shaft $b^7$ there is an axial bore $b^{35}$, in which is inserted one end of the armature-shaft $c$, which is provided with a feather $c'$, that fits into a groove $b^{36}$, so that one shaft may move relatively to the other. The worm-shaft is provided with a grooved collar $b^{37}$, having two annular flanges $b^{38}$ $b^{39}$, between which is arranged a spherical roller $d$, journaled on a pin $d^2$ of a bell-crank lever $d'$, which is suitably pivoted at the end of the casings $b$ $b'$.

Coiled around the armature-shaft $c$ (see Figs. 1 to 4) is a dynamometric spring $b^{40}$, which at one end rests in the groove of collar $b^{37}$ and at the other end has bearing on cone $c^2$, which is rigidly mounted on the armature-shaft and has an annular groove or track, in which steel balls $c^4$ run. The cone $c^2$ has ridges $c^5$, which keep the spring $b^{40}$ in central position. Said balls $c^4$ run in a groove in the collar $c^7$, which is fixed firmly upon the end of box $c^8$ and against oil-well $c^9$ and cup $c^{10}$. The box $c^8$ is supported by the lower motor-casing $c^{11}$, which also supports at its opposite end oil-well $c^{12}$ and box $c^{19}$, which is held by the cup $c^{20}$ and forms a bearing for the armature-shaft. The motor-casing $c^{11}$ also includes the supporting-shells $c^{13}$ $c^{13}$, pole-piece $c^{14}$, around which are placed the field-coils $c^{15}$, and the external field-cores $c^{16}$ and $c^{17}$. Lower casting or casing $c^{11}$ is supported on the bed-plate E by projections $c^{18}$. Disks $c^{21}$ are keyed to the armature-shaft by means of key $c^{22}$ and are held against longitudinal movement on the shaft by clamp-nuts $c^{23}$, said disks $c^{21}$, which form the armature-core, carrying armature-windings $c^{24}$, connected to commutator $c^{25}$. Bolts $c^{27}$ support the upper pole-casting $c^{26}$ on the external field-cores $c^{16}$ $c^{17}$, said casting being provided with pole-piece $c^{28}$, around which are placed the field-coils $c^{29}$ and the inclosing shells $c^{30}$ $c^{31}$. Shell $c^{30}$ is provided with hole $c^{32}$, closed by cover $c^{33}$ when access to the commutator is not desired.

Arranged on the upper pole-casting is the bottom supporting-plate $d^3$ of a suitable box, (not shown,) intended to inclose the entire motor-regulating device shown in Figs. 1, 2, and 5 to 8, inclusive. A base-plate $d^4$ is placed on the plate $d^3$ and supports a casting $d^5$, which is composed of main pressure-chambers $d^6$ and $d^7$, balanced piston-valve chamber $d^8$, piston-cylinder $d^9$, and ports or ducts $d^{10}$ and $d^{11}$, which connect the cylinder $d^9$ and chamber $d^8$. The chambers $d^6$ and $d^7$ are arranged at the lower and upper ends, respectively, of the narrower intermediate chamber $d^8$, which is provided with an exhaust-port $d^{12}$ from which the pipe $d^{13}$ leads off, while the main pressure-chambers $d^6$ and $d^7$ are provided with ports $d^{15}$ which are connected with the main pressure-pipe $d^{14}$ that is provided with a cut-off valve $d^{16}$, whereby the supply from the delivery-chamber $a^6$ of the pump, through the opening $d^{17}$ in said delivery-chamber, is shut off. Piston-chamber $d^9$ is closed at each end by head $d^{18}$ and $d^{19}$, head $d^{18}$ being provided with a projection $d^{20}$ and head $d^{19}$ with a projection or boss $d^{24}$. $d^{21}$ is a piston which is packed by packing $d^{22}$ and is guided in chamber $d^9$, its piston-rod $d^{23}$ being guided through the head $d^{19}$ and the strokes of the piston being limited in upward and downward direction by projections $d^{24}$ and $d^{20}$, respectively. The head $d^{19}$ has a stuffing-box $d^{25}$ for the piston-rod $d^{23}$.

At the upper end of the piston-rod $d^{23}$ is a cross-head $d^{26}$, which is guided on parallel rods $d^{27}$ $d^{27}$, arranged one at each side of and supported at their lower ends by the upper end of the piston-chamber and at their upper ends by overhanging arms or extensions $d^{28}$ of a bracket $d^{29}$, that is fixed on the upper end of the main pressure-chamber $d^7$. The bracket $d^{29}$ has a lower ring $d^{30}$, whereby a diaphragm $d^{31}$ is clamped over the otherwise-open upper end of the chamber $d^7$, and the upper part of the bracket is provided with a cup $d^{32}$, between which and the diaphragm $d^{31}$ a dynamometric spring $d^{33}$ is arranged. Above the cup $d^{32}$ the said bracket bears a plate $d^{34}$, which serves as a guide for a rod $d^{35}$, which carries on its lower end a balanced piston-valve $d^{36}$, guided in the intermediate chamber $d^8$, before referred to, and consisting of enlargements $d^{37}$ and $d^{38}$ for closing and opening the ports $d^{11}$ $d^{10}$ to the exhaust and pressure and of an intermediate part or neck $d^{39}$, the annular space around which forms the exhaust-port of the valve when either ports $d^{10}$ or $d^{11}$ are in communication with the space around said neck and with the exhaust-pipe $d^{13}$. Said rod $d^{35}$ carries a disk $d^{40}$, against which is clamped, by means of disk $d^{41}$ and nut $d^{42}$, the diaphragm $d^{31}$, and it also carries nuts $d^{43}$ and $d^{44}$, which limit or stop the valve in its upward and downward movements, respectively, by striking against the plates $d^{34}$ and the cup $d^{32}$.

The main frame or casting $d^5$ of the regulating device also supports a fulcrum-rod $d^{45}$, which extends transversely thereof back of the chamber $d^8$ and carries a double rock-lever $d^{46}$, the two rear arms of which extend on each side of the said frame or casting $d^5$ and are provided with pins $d^{47}$ $d^{48}$, which form bearings for the lower ends of links $d^{49}$ $d^{50}$. The upper ends of the said links have bearing on pins $d^{51}$ $d^{52}$, which project from opposite ends of cross-head $d^{26}$. At its forward end the double rock-lever $d^{46}$ carries a pin $d^{53}$, that passes through a slot $d^{54}$ in the adjustable slotted link $d^{55}$, which is fulcrumed on a pin $d^{56}$, carried by another double lever $d^{57}$, to be described. Link $d^{55}$ has a notch $d^{58}$ at one side of its slot, into which engages the pin $d^{53}$ of the rock-lever $d^{46}$, and which is made with an arc having the axis of lower pin $d^{56}$ as its center. A spring $d^{\times}$ is coiled upon the pin $d^{53}$, one end bearing on the end of the lever $d^{46}$ and the other end riding upon the inner edge of the link $d^{55}$ and its tendency being to keep the pin $d^{53}$ engaged in the notch or recess $d^{58}$ and to automatically engage it with said notch should it at any time be desirable to start the pump above the desired pressure. The said link may be easily disengaged from the pin $d^{53}$ by hand. The lower lever $d^{57}$ is fulcrumed on the rod $d^{45}$ of lever $d^{46}$ and bears at its outer end a cross-rod $d^{59}$, which carries a brush $d^{60}$, retained by a set-screw $d^{61}$. Said brush $d^{60}$ is adapted to bear upon and travel over the set of resistance-blocks $d^{62}$, which are supported by a bracket $d^{63}$, mounted on the base-plate or bottom $d^3$, and which include the armature-resistances $r'$, $r^2$, $r^3$, $r^4$, $r^5$, $r^6$, $r^7$, $r^8$, and $r^9$. (See Fig. 10.) Double lever $d^{57}$ carries beyond one end of the pin $d^{56}$ an engaging pin $d^{64}$, which is adapted to engage with the U-shaped slot of a cam $d^{65}$, mounted on a hub $d^{66}$, that is journaled on a shaft $d^{68}$, projecting from a bracket $d^{69}$, that is arranged at one side of lever $d^{57}$. Projecting in opposite directions from the said hub $d^{66}$ are the cut-out knives $d^{67}$, the movement of which is stopped in the one direction of rotation by a stop-block $d^{70}$ and in the other by opposite-projecting contact-forks $d^{71}$ and $d^{72}$, said stop-block and forks being arranged upon the said bracket $d^{69}$. Hub $d^{66}$ also carries a trip-pin $d^{73}$, which engages with a cam projection $d^{74}$ of an arm $d^{75}$, fulcrumed on the bracket $d^{69}$ at $d^{76}$ and kept in action by a spring $d^{77}$, which is fulcrumed at $d^{78}$ on the bracket $d^{69}$ and bears against a pin $d^{79}$, projecting from the bracket $d^{69}$.

Figure 9:
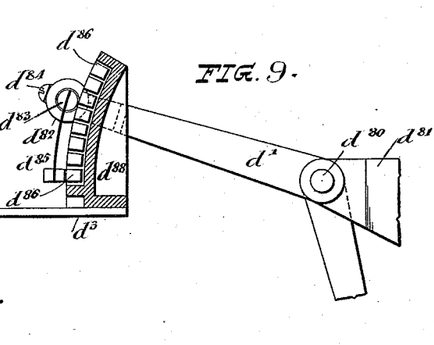
Fig. 9 is an enlarged detail view of the safety armature-resistances.

The before-referred-to bell-crank lever $d'$, which is acted on by the dynamometric spring $b^{40}$ between the armature-shaft and worm-shaft, is fulcrumed on a pivot-pin $d^{80}$, (see Fig. 9 in particular,) which projects from a bracket $d^{81}$, mounted on the end of casing $b'$. Bell-crank lever $d'$ carries at its upper end a hub $d^{82}$, from which projects a rod $d^{83}$, held fast by a set-screw $d^{84}$, and which carries a brush $d^{85}$, which is adapted to bear upon and travel over safety armature-resistance blocks $d^{86}$, which latter take in the resistances $r^{10}$, $r^{11}$, $r^{12}$, $r^{13}$, and $r^{14}$, $r^{15}$, and $r^{16}$, (see Fig. 10,) that are supported by a bracket $d^{88}$, mounted on the base-plate $d^3$ above the armature-casing.

The operation is as follows: When the electrical connections are formed, the armature-shaft $c$ drives the worm-shaft $b^8$, which has a feather-and-groove connection, as described, with the armature-shaft, so that a sliding or axial movement of the worm $b^7$ with reference to the armature-shaft is obtained, depending on the more or less counteracting effect of the worm wheel or gear $b^9$, which axial movement is taken up or cushioned by the dynamometric spring $b^{40}$, the thrust of which latter is taken up by the frictionless ball-bearing $c^4$. The worm $b^8$ drives the worm-wheel $b^9$, which is mounted on shaft $b^{10}$ between the ninety-degree cranks, which reciprocate the cross-heads in the yokes $b^{26}$ $b^{27}$, so that the reciprocating and circular motion of the cross-heads is transmitted into a transverse reciprocatory motion in the pump plunger-rods and plungers. The delivery-chamber $a^6$, which contains the main pressure, transmits its pressure through the connecting-pipe $d^{14}$ to the pressure-chambers $d^6$ and $d^7$, so that a like fluid-tension exists therein, whereby the parts connected with said chambers are, in connection with the latter, enabled to act as a hydraulic regulator which is governed by the dynamometric spring $d^{33}$, by which, through the aid of the balanced piston-valve $d^{36}$ $d^{37}$ $d^{38}$, the hydraulic piston $d^{21}$, and the levers $d^{46}$ $d^{57}$, the set of armature-resistances $r'$ to $r^9$ is thrown in the circuit and the motor-current cut off when the main pressure is reached, while the reverse operation takes place when the main pressure (through demand) falls below the desired pressure, or, in other words, when the cut-out switch $d^{67}$ completes the motor-circuit and the armature-resistances $r'$ to $r^9$ is automatically increased under gradually-increasing load through the operation of the dynamometric spring $b^{40}$ and the rack motion of the worm. The said dynamometric spring $d^{33}$ regulates the amount of pressure in the pump-main, and as soon as this pressure increases above the required degree the lower port $d^{11}$, connecting chambers $d^9$ and $d^8$, and which is covered by lower enlargement $d^{37}$ of the piston-valve, is opened by the increased pressure, so that water is admitted into the chamber $d^9$, under piston $d^{21}$, in a quantity proportionate to the amount of pressure over the required or normal amount. The so-admitted water drives up the piston $d^{21}$, and the upper piston-valve enlargement $d^{38}$ opens the upper port $d^{10}$ and exhausts at the same time and for the same amount, the rising piston forcing the water above it out through port $d^{12}$ and exhaust-pipes $d^{13}$. This same movement of the piston, through the medium of the connecting-links $d^{49}$ $d^{50}$, in turn lowers the levers $d^{46}$ and $d^{57}$, so that the armature-resistance is thrown into the circuit. In this case it is of course understood that the pin $d^{58}$ is in engagement with the notch in link $d^{55}$. The slotted link $d^{55}$ allows the motor to be started at any time independent of the operation of the hydraulic piston by a person taking hold of the said link, disengaging it from pin $d^{53}$, pulling it up, and thereby, through the movement of the lever $d^{57}$ and the action of the pin $d^{64}$ on cam $d^{65}$, imparting a partial rotation to the cut-out knives or switch $d^{67}$ and completing the armature-circuit through contact of said knives with forks $d^{71}$ $d^{72}$. The pin $d^{53}$ is automatically thrown, by the action of spring $d^{x}$, from slot $d^{54}$ into notch $d^{58}$ at the moment the main-pressure falls below the desired amount, whereupon the hydraulic regulator is ready to automatically cut off the current the moment the desired pressure is reached. When the main-pressure is lowered below the required amount, the spring $d^{33}$ presses the piston-valve down, thus opening port $d^{10}$ to pressure and port $d^{11}$ to exhaust, so as to force piston $d^{21}$ down and throw out more or less resistance. If it be desired to disconnect the hydraulic regulator, this is done by closing the valve $d^{16}$ in the main-pipe $d^{14}$. The safety armature-resistance $r^{10}$ to $r^{16}$ is thrown into the circuit by the action of the dynamometric spring $b^{40}$ and lever $d'$ when, from any fault of the suction or delivery valves, the pressure is greatly increased or diminished by an accident to the suction or delivery portions of the main.

G is the generator, (see Fig. 10,) provided with terminals X X', of which X is connected to the motor-field $c^{15}$ $c^{29}$ and armature-brushes $y$ $y'$. The generator-terminal X also takes in the cut-out knives or switch $d^{67}$, which is operated by lever $d^{57}$, while the terminal X' is connected to contact-fork $d^{71}$. The fork $d^{72}$ is connected to the motor-terminal Z', and between the forks $d^{71}$ and $d^{72}$ are located the cut-out knives $d^{67}$, which are shown in full lines in cut-out position and in dotted lines in completed-circuit position, having been operated by the movement of lever $d^{57}$ through pin $d^{64}$ engaging with the U-shaped cam $d^{65}$. The terminal Z is connected to the resistance-blocks $d^{62}$ and includes in circuit the resistances $r^9$ to $r'$ through the brush $d^{60}$, which is connected to the brush $d^{85}$, which includes either the resistances $r^{10}$ to $r^{13}$ or $r^{14}$ to $r^{16}$, according to the position of the brush $d^{85}$ as determined by the action of the dynamometric spring $b^{40}$.

Figure 10:
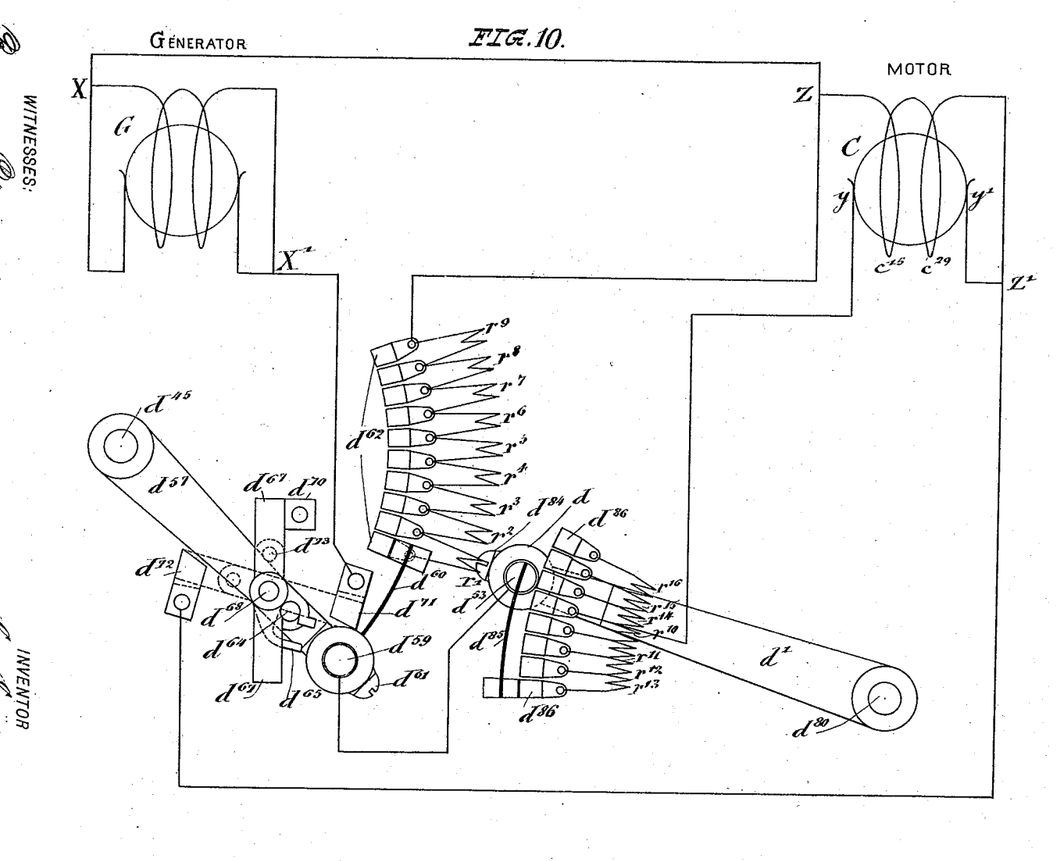
Fig. 10 is a diagrammatic view showing the electric connections of the motor, motor-regulator, safety-resistances, automatic cut-out, and generator.

When there is a fall in the main-pressure, the lever $d^{57}$ moves upwardly, causing pin $d^{64}$ to act on the U-shaped cam $d^{65}$ so as to move the cut-out knives $d^{67}$ in contact with the forks $d^{71}$ $d^{72}$ and complete the circuit in the main line X' Z', the spring-cam $d^{74}$ acting to keep the said knives $d^{67}$ in the forks, and at the same time to hold the said U-shaped cam in position to engage with the pin $d^{64}$ when the lever $d^{57}$ returns. The resistances $r'$ to $r^9$ are in this way gradually cut out of the armature-circuit Z, $y$, $y'$, and Z' as the motor rises to speed, while as the pressure in the main increases the resistances $r^{10}$ to $r^{13}$ are gradually thrown out, the resistances $r^{14}$ to $r^{16}$ being thrown in only upon a sudden increase of load through the failing action of pump-valves, water-hammer, &c. When the main-pressure has reached its maximum, the lever $d^{57}$ moves down, gradually throwing in resistances $r'$ to $r^9$, and at the end of its stroke the pin $d^{64}$ engages with the U-shaped cam $d^{65}$, and the knives $d^{67}$ are disengaged from the forks $d^{71}$ and $d^{72}$, swinging to their cut-out position against the stop $d^{70}$, cutting the motor-current and stopping the motor and pump until the main-pressure has fallen below the desired pressure, at which time the operation is automatically repeated.

The entire mechanism is self-contained and easily assembled, being composed of four distinct and easily-accessible parts—namely, the pump, the driving mechanism, the motor, and the regulating devices.

The dynamometric or relief spring of the motor has frictionless thrust-bearings, and the use of one such spring in this case allows the motor to be started under gradually-increasing load, with the motor free from any irregularities of pressure that might be occasioned by the operation of the pump. A shunt-motor is here used, as the one best adapted for the work. The field-coils of the motor can be readily wound rectangularly and bent into shape in flat portions whose planes are concentric with the circumference of the armature and the flat portions on the side of the armature being tangential to the cylindrical part of the coil, forming a motor, with the advantages of the construction of a directly-magnetized armature-motor without the danger of polarity reversals or becoming demagnetized.

This type of electric pump can be constructed for hydraulic-elevator service, high or low service, and operations for mine or other work where an entirely-incased and easily-accessible pumping mechanism is desired.

Having thus described my invention, what I claim as new is—

1. The combination with an electric motor and a pump operated thereby, of a hydraulic regulating device for the motor, and a pipe connected with the delivery-chamber of the pump and leading directly to the said regulating device, said pipe being adapted to directly transmit the fluid-pressure in said delivery-chamber to the regulating device for the automatic operation thereof, whereby the fluid-pressure in the delivery-chamber of the pump influences the motor, at all times, when said pipe is open to said regulating device.

2. The combination, with an electric motor, a pump and intermediate driving mechanism, of an automatic hydraulic regulating device for the motor, means for conducting fluid thereto from the pump, a safety armature-resistance supplemental or auxiliary to said regulating device, and means interposed between the pump and motor and acted on by the said driving mechanism for throwing more or less resistance thereby into the armature-circuit.

3. The combination, with an electric motor and a pump operated thereby, of a hydraulic regulating device for the motor, a pipe for conducting fluid thereto directly from the delivery-chamber of the pump, whereby the fluid-pressure in said delivery-chamber is transmitted to and automatically operates the said regulating device, a safety armature-resistance, supplemental or auxiliary to said regulating device, and means interposed between the pump and motor for throwing more or less resistance into the armature-circuit.

4. The combination, with an electric motor, and a pump driven thereby, of hydraulically-operated means for throwing resistance into the armature-circuit for controlling the fluid-discharge from the pump, and a safety device additional to and independent of said means, for throwing additional resistance into the armature-circuit so that the motor is rendered free from the influence of irregularities of the pump.

5. The combination with an electric motor, and a pump driven thereby, of a hydraulic regulating device, a pipe whereby the said regulating device is at all times, when open, directly connected with and influenced by the fluid-pressure in the delivery-chamber of the pump, and a rheostat in the armature-circuit, said rheostat being controlled directly by the fluid-pressure in and operated by said regulating device.

6. The combination, with an electric motor and a pump driven thereby, of a rheostat in the armature-circuit, a cut-out switch in the main circuit and independent of said rheostat, and means under the influence of the fluid-tension in the pump, for cutting the circuit in or out, and for throwing more or less resistance through said rheostat into the armature-circuit.

7. The combination, with an electric motor and a pump driven thereby, of a rheostat in the armature-circuit, a cut-out switch in the main circuit and independent of said rheostat, and a hydraulic regulator connected with the delivery-chamber of the pump, and provided with means for throwing more or less resistance, through said rheostat, into the armature-circuit, and for operating said cut-out switch.

8. The combination, with an electric motor and a pump driven thereby, of a rheostat in the armature-circuit, a cut-out switch in the main circuit and independent of said rheostat, and means influenced by the fluid-tension in the delivery-chamber of the pump for automatically operating said cut-out switch and breaking the circuit when the resistance through the said rheostat is at the maximum.

9. The combination, with an electric motor and a pump driven thereby, of a rheostat in the armature-circuit, a cut-out switch in the main circuit, means subjected to the influence of the fluid-tension in the delivery-chamber of the pump for automatically operating said rheostat for throwing more or less resistance into the armature-circuit and for operating said cut-out switch, and a safety-resistance arranged in the armature-circuit and under the influence of the connections between the pump and motor.

10. The combination, with an electric motor and a pump driven thereby, of a rheostat in the armature-circuit, a hydraulic regulating device connected with the pump and under the influence of the fluid-tension therein, means for manually operating said rheostat, and means connected with the hydraulic regulating device for automatically connecting the same with said manually-operative means, whereby the rheostat is placed under the automatic control of said hydraulic regulating device.

11. The combination, with an electric motor, and a pump driven thereby, of a rheostat in the armature-circuit, a hydraulic dynamometric regulating device connected with the delivery-chamber of the pump, a cut-out switch in the main circuit, means for manually closing said switch for starting up the motor and for operating said rheostat, and means connected with the hydraulic regulating device for automatically connecting the same with said manually-operative means, whereby the rheostat and cut-out switch are placed under automatic control.

12. The combination, with an electric motor, of a cut-out switch in the main circuit, a rheostat in the armature-circuit said switch being independent of said rheostat, and automatic dynamometric means in common with and for operating both the rheostat and switch.

13. The combination, with an electric motor, of a rheostat in the armature-circuit, a hydraulic regulating device provided with two levers, and means for connecting the levers or disconnecting them, one of said levers being connected with the rheostat.

14. The combination with an electric motor, of a rheostat in the armature-circuit, and a hydraulic regulating device provided with two levers and with a spring-actuated link, pivoted to one of said levers and engaging the other lever, whereby the levers may be disconnected for manual operation or automatically connected with the rheostat.

15. The combination with an electric motor, of a rheostat in the armature-circuit, a cut-out switch in the main circuit, a lever connected with the rheostat, means for operatively connecting said cut-out switch with said lever, and a hydraulic regulating device connected with said lever.

16. The combination with an electric motor of a rheostat in the armature-circuit, and a hydraulic regulating device, comprising a valved fluid-chamber provided with fluid-inlets at each side of the valve, a dynamometric device subjected to the action of the fluid at one end of the valve, and between which and the valve one of said inlets is located, another chamber containing a piston, suitably connected with said rheostat, and suitable ducts or passages, one on each side of said piston for leading off the pressure fluid.

17. The combination with an electric motor, of a rheostat in the armature-circuit, and a hydraulic regulating device, provided with a dynamometric device, a valve, means for introducing fluid between the dynamometric device and valve, means for introducing fluid to the opposite end of the valve, suitable ducts or passages controlled by said valve, and suitable means connected with the rheostat and operated by the fluid issuing from the one or the other of said valve-controlled ducts or passages.

18. The combination, with a hydraulic dynamometric regulating device, a cut-out switch and a set of resistances, of a set of levers, adapted to move independently, and a link connecting the levers, said levers operating the resistances and cut-out switch.

19. The combination, with a hydraulic dynamometric regulating device, a set of electric resistances, and a cut-out switch, of levers for operating said switch and resistances, a link connection between the levers, and a spring acting to automatically bring one lever into operation with the other.

20. The combination, with an electric cut-out switch, and a hydraulically-operated lever for operating said switch, of a spring-cam acting to hold the switch in open or closed position.

21. The combination, with an electric cut-out switch, a hydraulically-operated lever, a spring-cam acting on the switch also, and a set of resistances operated by said lever, of a set of dynamometrically-operated safety-resistances.

22. The herein-described hydraulic dynamometric regulating device, comprising a balanced piston-valve, a diaphragm, and a dynamometric spring, of a bracket supporting said spring, a clamp for the diaphragm, and means for limiting the travel of said valve.

23. The combination, with an electric motor and a pump operated thereby, of a set of armature-resistances, means connected with the pump for hydraulically controlling the same, a set of dynamometric safety-resistances, both sets of resistances being embraced in the armature-circuit, and means for controlling said dynamometric safety-resistances.

24. The combination, with an electric motor, and a pump operated thereby, of a rheostat in the armature-circuit, a hydraulic regulating device connected with the pump and provided with two levers, and means for connecting the two levers or disconnecting them, one of said levers being connected with the rheostat and the other being adapted through said connecting means of the levers to break the connection between the rheostat and said regulating device.

25. The combination, with an electric motor and a pump operated thereby, of a rheostat in the armature-circuit, and a hydraulic regulating device connected with the pump, and provided with two levers, and with a spring-actuated link, pivoted to one of said levers and engaging the other lever, whereby the levers may be disconnected or connected as desired.

26. The combination, with an electric motor and a pump operated thereby, of a rheostat in the armature-circuit, a cut-out switch in the main circuit, a hydraulic regulating device connected with the pump and provided with a lever connected with said rheostat, and means for operatively connecting the said lever and cut-out switch.

27. The combination, with an electric motor and a pump operated thereby, of a rheostat in the armature-circuit, and a hydraulic regulating device, comprising a valved fluid-chamber provided with fluid-inlets at each side of the valve, communicating with the delivery-chamber of the pump, a dynamometric device between which and the valve one of said inlets is located, another chamber containing a piston, suitably connected with said rheostat, and suitable ducts or passages one at each side of said piston for leading off the pressure fluid.

28. The herein-described dynamometric hydraulic regulating device, consisting of two chambers, provided with fluid-inlets, a diaphragm at the end of one of said chambers, a dynamometric spring acting on said diaphragm, a piston-chamber, ducts or passages connecting the same with the first two chambers, an exit, means for controlling the communication between said first two chambers and the said ducts or passages and between the latter and said exit, a piston in said piston-chamber, and suitable mechanism connected with said piston.

29. The herein-described dynamometric hydraulic regulating device, consisting of two chambers, provided with fluid-inlets, a valve working between said chambers, a diaphragm at the end of one of said chambers, a dynamometric spring acting on said diaphragm, a piston-chamber, ducts or passages connecting the latter and the first two chambers, and controlled by said valve, an exit also controlled by said valve, a piston in said piston-chamber, means for limiting the movement of said valve, means for limiting the movement of the piston, and suitable mechanism operated by said piston.

30. The combination of the bed-plate, the incased armature thereon, the pump, and the incased driving mechanism supported also on said bed-plate, between the motor and pump, the casing of the pump being supported by the casing of the driving mechanism.

31. The combination, with an electric motor, of the pump proper, the driving mechanism provided with a longitudinally-movable driving-shaft terminating between the motor and pump, a relief-spring between said shaft and the armature-shaft, a safety armature-resistance, and means controlled by said intermediate spring for throwing in more or less resistance.

32. The combination, with an electric motor, of a pump, driving mechanism arranged between the motor and pump, a safety-resistance in the armature-circuit, and arranged between the pump and motor, and means by which said safety-resistance is connected with a suitable portion of the driving mechanism.

33. An electric motor provided with field-coils, portions of which are concentric with the circumference of the armature, and portions of which, at the side of the armature are tangential to the cylindrical part of the coil.

In testimony that I claim the foregoing as my invention I have signed my name in presence of two subscribing witnesses.

CARL EICKEMEYER.

Witnesses:
   L. W. EICKEMEYER,
   GEO. EICKEMEYER.